(12) United States Patent
Skurnik

(10) Patent No.: US 7,094,978 B2
(45) Date of Patent: Aug. 22, 2006

(54) SYSTEM AND METHOD FOR GENERATING A HIGH SPEED ESTIMATED POSITION OUTPUT FOR A POSITION ENCODER

(75) Inventor: David Skurnik, Kirkland, WA (US)

(73) Assignee: Mitutoyo Corporation, Kawasaki (JP)

( * ) Notice: Subject to any disclaimer, the term of this patent is extended or adjusted under 35 U.S.C. 154(b) by 119 days.

(21) Appl. No.: 10/298,339

(22) Filed: Nov. 15, 2002

(65) Prior Publication Data
US 2004/0094338 A1    May 20, 2004

(51) Int. Cl.
G06G 11/06 (2006.01)

(52) U.S. Cl. ............................ 178/18.01; 178/18.02; 178/18.03

(58) Field of Classification Search .............. 345/157, 345/163, 156, 173–183, 700, 706, 473; 178/18.01, 178/18, 19; 715/700; 250/231.13; 114/312; 713/323; 600/450; 324/207.17; 340/679
See application file for complete search history.

(56) References Cited

U.S. PATENT DOCUMENTS

| | | | |
|---|---|---|---|
| 5,444,240 A | | 8/1995 | Nakayama |
| 5,635,683 A | * | 6/1997 | McDermott et al. ..... 178/19.04 |
| 5,721,546 A | | 2/1998 | Tsutsumishita |
| 5,841,274 A | | 11/1998 | Masreliez et al. |
| 5,864,333 A | * | 1/1999 | O'Heir ........................ 345/157 |
| 5,948,105 A | * | 9/1999 | Skurnik et al. .............. 713/323 |
| 6,002,250 A | * | 12/1999 | Masreliez et al. ..... 324/207.16 |
| 6,005,387 A | | 12/1999 | Andermo et al. |
| 6,011,389 A | | 1/2000 | Masreliez et al. |
| 6,049,204 A | | 4/2000 | Andermo et al. |
| 6,191,415 B1 | * | 2/2001 | Stridsberg .............. 250/231.13 |
| 6,304,832 B1 | | 10/2001 | Andermo et al. |
| 6,329,813 B1 | | 12/2001 | Andermo |
| 6,377,281 B1 | * | 4/2002 | Rosenbluth et al. ........ 715/700 |
| 6,400,138 B1 | | 6/2002 | Andermo |
| 6,639,529 B1 | | 10/2003 | Jansson |
| 6,653,831 B1 | * | 11/2003 | Friend et al. ................ 324/244 |
| 6,662,742 B1 | * | 12/2003 | Shelton et al. .............. 114/312 |
| 2002/0055680 A1 | * | 5/2002 | Miele et al. ................. 600/450 |
| 2004/0085215 A1 | * | 5/2004 | Moberg et al. ............. 340/679 |
| 2004/0239345 A1 | * | 12/2004 | Amini ......................... 324/702 |

OTHER PUBLICATIONS

Morgan, D., "Quadrature-Encoded Position and Beyond," Embedded.com, Feb. 26, 2001, <http://www.embedded.com/story/OEG20010222S0053> [retrieved Nov. 7, 2002], 8 pages.

* cited by examiner

Primary Examiner—Bipin Shalwala
Assistant Examiner—Prabodh Dharia
(74) Attorney, Agent, or Firm—Christensen O'Connor Johnson Kindness PLLC

(57) ABSTRACT

A system and method for generating an approximated position signal that is updated and output at a rate higher than a base rate of actual position signals measured using a position transducer. The actual position signals are determined and/or stored by a transducer signal processing circuit at discrete time intervals. The approximated position signals are generated by a high frequency estimated position generating circuit. A rate of incrementing the approximated position signals is adjusted for use during the next discrete time interval by an error correction feedback loop, based on a difference between certain approximated and actual position values. The accuracy of the system may be further improved by utilizing a latch signal to ensure that the approximated and actual position values that are compared by the error feedback loop correspond to the same time.

29 Claims, 8 Drawing Sheets

SYSTEM AND METHOD FOR GENERATING A HIGH SPEED ESTIMATED POSITION OUTPUT FOR A POSITION ENCODER

FIELD OF THE INVENTION

This invention relates generally to position encoders, and more particularly to a system and method for the processing of electronic signals used in position encoders.

BACKGROUND OF THE INVENTION

Various position encoders for sensing linear, rotary or angular movement are currently available. These encoders are generally based on either inductive transducers, capacitive transducers, optical systems, or magnetic scales. In general, an encoder may comprise a transducer with a readhead and a scale. The readhead may comprise a transducer element and some transducer electronics. The transducer outputs signals vary as a function of the position of the readhead relative to the scale along a measuring axis. The transducer electronics outputs the signals to a signal processor or processes the signals internally before outputting modified signals indicative of the position of the readhead relative to the scale. It is also common for an encoder system to include an interface electronics separate from the readhead, and to interpolate or otherwise processes the transducer signals in the interface electronics before outputting modified signals indicative of the position of the readhead relative to the scale to an external host system such as a motion control system or data acquisition system.

Optical position encoders, both rotary and linear, use optical detectors to sense position. The optical elements in some of these types of encoders have been designed to produce electronic output signals in phase quadrature. In certain types of these systems, an optical readhead outputs two continuous analog sine wave signals that vary in the amplitude relationship between their phase quadrature signals as the position changes. The scale pitch $\lambda_0$ of an optical scale is the fundamental wavelength of the optical position encoder system. In one common type of example optical encoder, the scale pitch $\lambda_0$ may be in the range of 20 to 40 micrometers. In such systems the analog quadrature signals are frequently connected to an electronic signal interpolation device. The output of this device is typically two digital quadrature signals derived from the two continuous analog sine wave signals. These digital quadrature signals are then in a form suitable for use by subsequent digital processing electronics that determine and/or accumulate position changes of the optical encoder. In another type of traditional optical detector, the interpolating electronics may be incorporated inside the readhead.

In such optical encoder systems the analog signals are produced from the optical transducer signals, and the digital signals are created by the interpolation electronics. The analog sine waves have the scale pitch $\lambda_0$ An example of the most simple type of interpolation is commonly referred to as 4X interpolation. In this case, the analog quadrature signals have been changed into digital quadrature waveforms with the same pitch or wavelength $\lambda_0$. The term 4X is used because for each wavelength traversed, there are 4 edges, or transitions, of the digital signals. The subsequent electronics are capable of detecting these 4 edges, and thus can detect or record the optical encoder position with a resolution of $R1=\lambda_0/4$. As an example of a more advanced type of interpolation, the relationship between the analog signals may be interpolated by an extra factor of 4. In this case, the subsequent electronics can record the position with a resolution of $R2=\lambda_0/16$. In general, in certain example systems interpolation electronics of this type have interpolation factors ranging from 4 to 400, or more.

The nature of the optical systems described above are such that the analog waveforms from the position transducer are continuous with position and time. There are no interruptions in such analog. Because of the continuous nature of these signals, the subsequent interpolating electronics generally continuously derives and outputs the corresponding interpolated digital output signals by continuously processing the continuous analog waveforms.

In contrast, U.S. Pat. Nos. 6,005,387, 6,049,204 6,400,138 and 6,329,813, each incorporated by reference in their entireties, disclose incremental and absolute inductive position transducers, or encoders, that operate on a sampled basis. In such encoders, the absolute position is sampled and/or determined on an intermittent or periodic basis, where the sample period in some systems is typically in the range of 100–200 microseconds or more. At times between the discrete position samples, no new position information is available. Such "interrupted" or "sampled" signals are not conventional in many motion control systems and are not familiar to many users of position encoders. Accordingly, it is not easy for some users to implement such encoders in various applications. For example, in order to be compatible with existing control systems, in various applications the output from such "position sampling" inductive devices would preferably be in the form of continuous digital quadrature signals similar to those of the traditional optical position encoders. However, it is more difficult to create accurate two phase, continuous digital quadrature signals from the sampled signals of such inductive encoders and the like than from continuous analog signals, such as those from an optical encoder, or the like.

The present invention is directed to providing a system and method that overcome the foregoing and other disadvantages limiting the use of position sampled inductive encoders and the like. More specifically, the present invention is directed to a system and method for generating position outputs at a higher rate than the native underlying sample rate of such position sampled encoders, for example, in the form of continuous incremental quadrature signals.

SUMMARY OF THE INVENTION

Certain absolute position sensors, for example the inductive types disclosed above, operate on an intermittent or periodic sampling basis. In one example the raw transducer waveforms may be of a three phase type, but the present invention applies equally to a transducer with any number of phases. The transducer waveforms are sampled and the absolute position is determined not more frequently than every T seconds, which is a minimum possible sample period for the device. The absolute position that is determined is based on the sampled data.

Although the transducer electronic system is capable of determining the position intermittently or periodically, in certain implementations it is desirable to convey position information externally in between the intermittent times upon demand from a host system or in a continuous manner between the intermittent times using industry standardized incremental quadrature signals or the like. In the case of continuous incremental quadrature signals, each transition, or edge, of the quadrature signals represents one count up or down, where one count represents the resolution of the system, or the smallest detectable incremental position change. As an example system, the resolution in one embodiment could be on the order of fractions of a micrometer, such as 0.1 to 0.5 micrometer. The peak velocity of motion of such a system could be in the range of 5 to 10 meters per second. Given a sampling time T of 100 microseconds, a velocity of 5 meters/second, and a resolution of 0.5 micrometer, the total distance traversed in one period T would be 500 micrometers, or 1000 counts. Therefore, in this example system, it would be desirable for the system to be outputting incremental quadrature signals at a rate on the order of 1000 counts/T, or more, and to continue to do so while the system determines the value for the next position sample from the transducer. It would be desirable for this continuous quadrature output to persist during the time between the transducer position samples, thus bridging between the transducer position samples with estimated positions. It should be appreciated that such estimated positions can still be reasonably accurate, because a sampling time T of 100 microseconds, for example, still provides relative frequent position information relative to the response frequency of many practical mechanical motion systems and actuators.

In accordance with one aspect of the invention, the system produces an estimated or approximated position signal that is updated at a rate higher than a base rate of the measured transducer position signals. The approximated position signals may be utilized to produce quadrature outputs that are compatible with existing control systems. The measured transducer position signals are processed and/or stored by a signal processing circuit at discrete time intervals. The approximated position values are generated by a high frequency position estimation circuit. The approximated position signal is intermittently or periodically compared by an error correction feedback loop of the position estimation circuit to an appropriate measured transducer position signal and the resulting difference stored in an error register for use by the position estimation circuit during the next discrete time interval. In one embodiment, the accuracy of the approximated position signal may be further improved by utilizing a QLATCH signal to ensure that the approximated position signal and the measured transducer position signal that are compared by the error feedback loop correspond to the same time. In other words, a timing signal based on the effective sample time of the measured transducer position signal may be utilized to generate a QLATCH signal to synchronize the timing for the compared approximated position signal.

In accordance with another aspect of the invention, the system includes a position transducer, a transducer signal processing circuit, and a position signal generating circuit. The transducer signal processing circuit generates a transducer sample position output corresponding to the position of the transducer, according to a transducer sample position output interval that is not less than a minimum transducer sample position output interval. The position signal generating circuit generates an approximated position output according to an approximated position output cycle interval which is shorter than the minimum transducer sample position output interval. The approximated position output is incremented by a prescribed increment amount during the approximated position output cycle, and the prescribed increment amount is adjusted when a new transducer sample position output becomes available. The adjustment in the prescribed increment amount is based at least partially on a difference between the approximated position output and the new transducer sample position.

In accordance with another aspect of the invention, the various components of the system may be connected to one another by either wireless or wired connections, or a combination thereof. For example, the position transducer, transducer signal processing circuit, and position signal generating circuit may all be coupled to one another by either wired or wireless connections.

In accordance with another aspect of the invention, the difference determining approximated position output may be selected by either the transducer signal processing circuit or the position signal generating circuit, based on timing information corresponding to the timing of the new transducer sample position. In one embodiment, the timing information corresponding to the timing of the new transducer sample position may be a value-latching signal output by the transducer signal processing circuit and input by the position signal generating circuit. Alternatively, the timing information corresponding to the timing of the new transducer sample position may either be serially-transmitted timing data or parallel-transmitted timing data that is output by the transducer signal processing circuit and input by the position signal generating circuit.

In accordance with another aspect of the invention, the transducer sample position output interval that corresponds to a sample timing of the new transducer sample position may be determined by either the transducer signal processing circuit or the position signal generating circuit based on timing information corresponding to the timing of the difference-determining approximated position output. The timing information corresponding to the timing of the difference-determining approximated position output may be an approximated position timing signal output by the position signal generating circuit and input by the transducer signal processing circuit.

In accordance with another aspect of the invention, in one embodiment the ratio of the nominal approximated position output cycle interval to the minimum transducer sample position output interval allows at least 500 approximated position outputs during the minimum possible transducer sample position output interval. In another embodiment, the ratio of the nominal approximated position output cycle interval to the minimum possible transducer sample position output interval allows at least 1800 approximated position outputs during the minimum possible transducer sample position output interval.

In accordance with another aspect of the invention, the position transducer may be an inductive position transducer and the approximated position output may comprise a quadrature output. The inductive position transducer may be an absolute inductive position transducer. The transducer signal processing circuit may be a symmetric sampling transducer signal processing circuit. The approximated position output cycle interval may correspond to a maximum quadrature signal frequency, and the maximum quadrature signal frequency may be greater than 500 Kilohertz, corresponding to a quadrature counting frequency of 2 million counts per second. In another embodiment, the maximum quadrature signal frequency may be greater than 2.5 megahertz, corresponding to a quadrature counting frequency of 10 million counts per second.

In accordance with another aspect of the invention, in another embodiment the system includes a position transducer and a transducer signal processing circuit. The transducer signal processing circuit generates a discrete transducer sample position output corresponding to the position of the position transducer at a particular time. The transducer signal processing circuit generates a timing information signal corresponding to the particular time. The transducer sample position output and the corresponding timing information signal correspond to the particular time and are outputtable to a position generating circuit.

In accordance with another aspect of the invention, the corresponding timing information signal that corresponds to the particular time may be a signal usable to operate a value-latching circuit, or a serially-transmitted timing data signal, or a parallel-transmitted timing data signal. In another embodiment, the corresponding timing information signal that corresponds to the particular time is output at a time which is not the particular time.

In accordance with another aspect of the invention, the system may include an approximated position generating circuit that generates an approximated position output according to a nominal approximated position output cycle interval which is shorter than a minimum transducer sample position output interval of the position transducer. The transducer signal processing circuit may output the generated discrete transducer sample position output corresponding to the position of the position transducer at a particular time and the generated timing information signal corresponding to the particular time to the approximated position generating circuit. The approximated position generating circuit may generate a first plurality of approximated position outputs that are incremented at a first rate prior to receiving one of the generated discrete transducer sample position outputs corresponding to the position of the position transducer at a particular time and the generated timing information signal corresponding to the particular time. The approximated position generating circuit may generate a second plurality of approximated position outputs that are incremented at a second rate after receiving the one of the generated discrete transducer sample position outputs corresponding to the position of the position transducer at a particular time and the generated timing information signal corresponding to the particular time. The second rate may be based at least partially on the generated discrete transducer sample position outputs corresponding to the position of the position transducer at a particular time, or the generated timing information signal corresponding to the particular time, or an approximated position output corresponding to the particular time.

In accordance with another aspect of the invention, the position generating circuit may be remotely located from the transducer signal processing circuit. In one embodiment, the various components of the system may be coupled through either a wireless communication interface circuit or a wired connection.

In accordance with another aspect of the invention, the position generating circuit includes at least a portion of one of the following types of circuits: a special-purpose custom digital circuit; a programmed commercial gate array; a programmed commercial digital signal processing circuit; a programmed general-purpose computer; a programmed motion-controller; a general-purpose computer; or a programmed computer used as a motion control system host.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
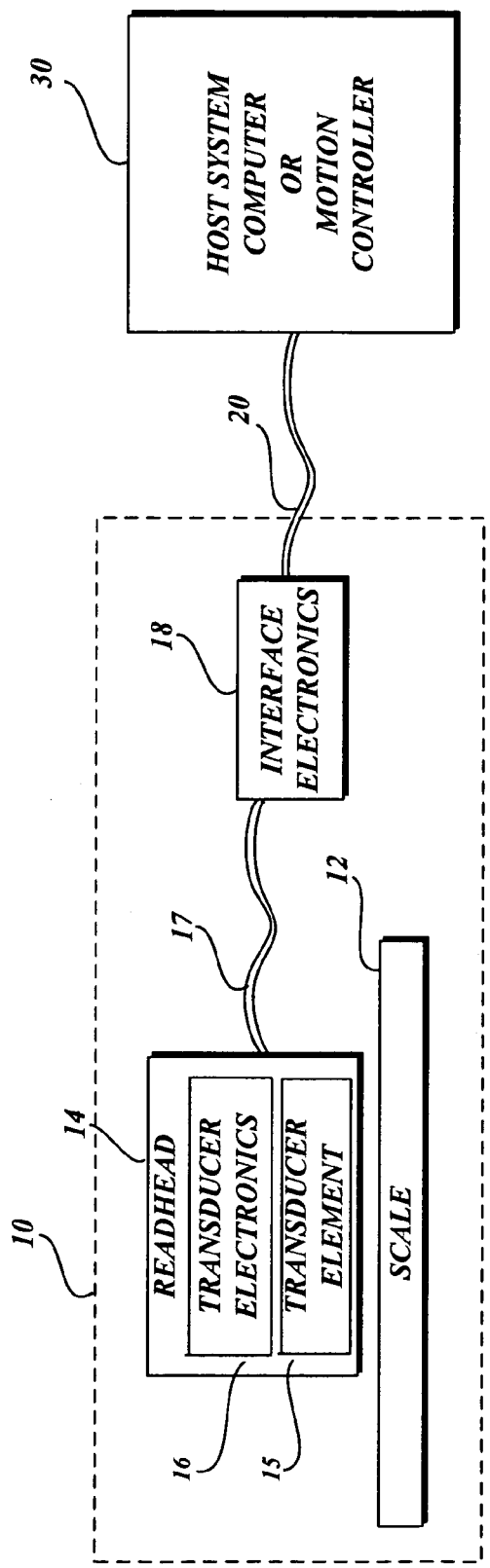
FIG. 1 is a block diagram of a position encoder system.

FIG. 1 is a block diagram of a position encoder 10 and a host system computer or motion controller 30. The terms position encoder and position encoder system are generally used interchangeably herein, unless otherwise indicated. The position encoder 10 may be any type of encoder, for example a linear position encoder intended for use by servo controllers in applications such as pick-and-place machines, fluid dispensing machines, etc. The position encoder 10 includes a scale 12, a readhead 14, a cable 17, and an interface electronics 18. The host system computer or motion controller 30 may be in the form of a servo controller, and communicates via a cable 20 to the position encoder 10 to receive position information.

In operation, the host system computer or motion controller 30 exchanges commands and/or data over the cable 20 with the interface electronics 18. The interface electronics 18 exchanges commands and/or data via the cable 17 with the readhead 14. In various exemplary embodiments, the interface electronics 18 may trigger position sample acquisition in the readhead 14. The readhead 14 collects signals based on the position of the scale 12 using a readhead transducer element 15, then analyzes and/or digitizes the signals using transducer electronics 16, and sends the signals via the cable 17 to the interface electronics 18. In various exemplary embodiments according to this invention, the interface electronics 18 computes position information based on the signals, and sends the position information to the host system computer or motion controller 30 via the cable 20. As an alternative, in various exemplary embodiments all or part of the interface electronics 18 may be configured as a plug-in card and/or embedded software routines or the like, and included in the host system computer or motion controller 30. In such cases the cable 20 may be eliminated.

It should also be appreciated that other types of connections between the transducer electronics 16 and the interface electronics 18 are within the scope of this invention. For example, the readhead 14 may receive power from a separate connection (not shown), and the transducer electronics 16 and the interface electronics 18 may be connected by any now known or later developed wireless communication methods. In such cases, the cable 17 may be eliminated. Also, when an application does not restrict the volume available in and around the readhead 14, the interface electronics 18 may be included in or adjacent to the readhead 14, and the cable 17 may be eliminated or replaced by any other appropriate type of connection.

In various exemplary embodiments, the position encoder 10 and host system computer or motion controller 30 may operate in a request and response format, such that the host computer or motion controller 30 sends a request for position information and the interface electronics 18 responds with the position information. In various exemplary embodiments according to this invention, the interface electronics 18 responds with estimated or approximate position information within a response time determined by an operation rate of the interface electronics 18, regardless of an operation rate of the readhead 14. In various other exemplary embodiments according to this invention, the interface electronics 18 continuously outputs estimated or approximate position information to the host system computer or motion controller 30, at a rate determined by an operation rate of the interface electronics 18, regardless of an operation rate of the readhead 14.

In various exemplary embodiments, the interface electronics 18 and readhead 14 may also operate in a request and response format. This process includes three steps. First, the interface electronics 18 sends a request for position information. Then, the readhead 14 obtains a position sample corresponding to an effective sample time. Finally, the readhead 14 responds by transmitting the position sample information to the interface electronics 18. In various other exemplary embodiments according to this invention, the readhead 14 operates according to an internally determined rate and periodically outputs position sample information to the interface electronics 18, at a maximum rate corresponding to a minimum position sampling and output time, regardless of an operation rate of the interface electronics 18.

It should be appreciated that in various embodiments according to this invention, the effective sample time corresponding to position sample value determined by the readhead 14 does not correspond to the time that the position sampling is initiated or the time that the position sample value is sent to the interface electronics 18. Rather, the effective sample time corresponds to a time point part way through the position sampling and output time period of the readhead 14.

For example, in various exemplary embodiments, the transducer output signals are integrated over a period of time (to improve the signal to noise ratio), and/or the transducer electronics 16 may implement symmetric sampling, described further below, so that the position sample value is based on multiple transducer signal samples instead of one. In such a case, the effective sample time corresponds to a time point part way through the position sampling period. An exemplary embodiment of an encoder utilizing symmetric sampling is described in U.S. Pat. No. 6,304,832, which is commonly assigned and hereby incorporated by reference in its entirety. Various other design considerations are related to symmetric sampling and other position encoder signal processing operations relevant in various exemplary embodiments according to this invention, including a method for calibrating a delay time of the effective sample time, which is described in U.S. patent application Ser. No. 10/146,437, which is commonly assigned and hereby incorporated by reference in its entirety.

In one embodiment, the position encoder 10 may utilize both integration and symmetric sampling and the transducer that is utilized in the readhead 14 may be an inductive transducer. Various exemplary embodiments of inductive transducers usable in combination with this invention are described in U.S. Pat. Nos. 6,011,389, and 6,005,387, which are commonly assigned and hereby incorporated by reference in their entireties.

In accordance with the present invention, an approximated position signal may be updated at a rate higher than the base rate of the measured transducer position signals. In other words, while the readhead 14 may provide relatively lower frequency measured transducer position samples to the interface electronics 18, relatively higher frequency or on demand output signals representing approximated position signals may be being provided to the host system computer or motion controller 30. As will be described in more detail below, in one embodiment the higher frequency or on demand output signals may be provided by high frequency position estimation circuitry, which may be located within the system as part of the interface electronics or other circuitry. As will also be described in more detail below, the high frequency position estimation circuitry may provide quadrature signals usable by standard control systems. The high frequency position estimation circuitry may also be driven by a high speed clock so as to run continuously independent of the sampling process occurring in the transducer electronics 16. As will also be described in more detail below, the accuracy of the system may be further improved by utilizing a QLATCH signal to ensure that the approximated position signal and the measured position signal that are compared by the error feedback loop correspond to the same effective sample time.

Figure 2:
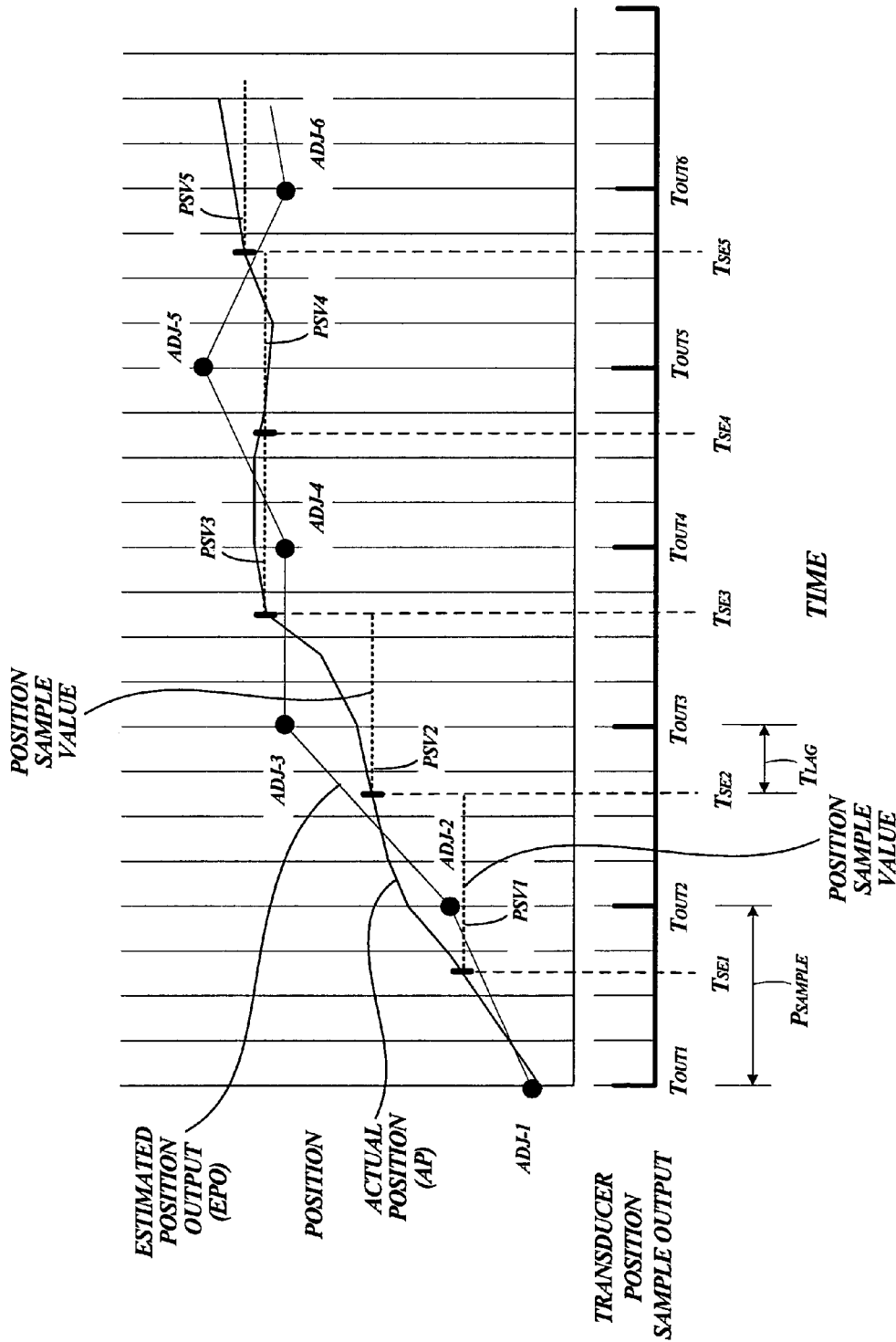
FIG. 2 is a timing diagram comparing estimated and actual position outputs of a position encoder system.

FIG. 2 is a timing diagram illustrating estimated position outputs and actual position information for the position encoder system 10. As will be described in more detail below, in accordance with the present invention, the estimated position output is updated at a rate higher than the base position sample rate of the position transducer that determines the measured actual position. As noted above, as compared to the discrete time interval sampling of the measured transducer actual position signals from the transducer electronics, in various exemplary embodiments the estimated position signal may be provided by quadrature generating circuitry which is designed to produce relatively continuous quadrature signals throughout the discrete time interval. In general, the measured transducer actual position signals are processed and/or stored by a signal processing circuit at discrete time intervals in a position register. The estimated position value is generated through the quadrature generating circuitry and is both stored in an output register and output. Periodically, when a new measured transducer position value is available, an appropriate estimated position is compared to the measured transducer position and the resulting difference is stored in an error register for use by the estimated position value circuitry during the next discrete time interval. As noted above, the utilization of a QLATCH signal can help ensure that the approximated position signal and the measured position signal that are compared correspond to the same time.

FIG. 2 illustrates the interrelationship between the relatively continuous estimated position outputs (EPO) of the interface electronics 18, the actual position sample values (PSV) determined at discrete times based on the signals of the readhead 14, and the underlying continuous actual positions (AP) of the scale 12 relative to the readhead 14. In the embodiment shown in FIG. 2, the readhead 14 continuously acquires position samples and the related position sample values (PSV) are determined, all during a minimum position sampling time $P_{sample}$. The time between each time $T_{outN}$ and $T_{outN+1}$ is the minimum position sampling time $P_{sample}$ in FIG. 2. At a time $t_{out1}$, the estimated position output EPO begins to increase at a first rate that is determined at the time of an initial adjustment point ADJ-1, as outlined further below. The actual position AP is shown to be increasing faster than the estimated position output EPO. During the time interval between $t_{out1}$, and $t_{out2}$ the readhead 14 acquires position samples and the related position sample value PSV1 is determined corresponding to an effective sample time $t_{se1}$. Nominally, the actual position AP is the same as the position sample value PSV1 at the effective sample time $t_{se1}$, as shown in FIG. 2.

At a time $t_{out2}$, the rate of change of the estimated position output EPO is adjusted, as indicated by the corresponding adjustment point ADJ-2. The adjustment in the rate of change of the estimated position output EPO at the adjustment point ADJ-2 is made at least in part based on the computation of the difference between the position sample value PSV1 and the estimated position output EPO at the previous effective sample time $t_{se1}$. As will be described in more detail below, the use of a synchronizing signal QLATCH at the effective sample time $t_{se}$ can help ensure that the value of the estimated position EPO that is compared to the position sample value PSV1 corresponds to the same effective sample time.

During the time interval between $t_{out2}$ and $t_{out3}$ the readhead again acquires position samples and the related position sample value PSV2 is determined corresponding to an effective sample time $t_{se2}$. Nominally, the actual position AP is the same as the position sample value PSV2 at the effective sample time $t_{se2}$. In accordance with the difference between the estimated position output EPO and the position sample value PSV2 at the effective sample time $t_{se\ 2}$, an adjustment in the rate of change of the estimated position output is made at the output time $t_{out3}$, as indicated by the corresponding adjustment point ADJ-3. Each output time $t_{out}$ is the time that a new position sample value, such as PSV2 or the like, is available in the interface electronics 18. Thus, at each output time $t_{out}$, the interface electronics 18 has a new basis for determining a new rate of change of the estimated position output, as outlined further below. In various exemplary embodiments, depending on the operation of the readhead 14, there may be a time difference between the effective sample time $t_{se}$ and the output time $t_{out}$ for a position sample value PSV. This time difference is shown as the lag time $T_{lag}$ in FIG. 2. The operations of the timing diagram shown in FIG. 2 similarly continue for output times $t_{out3}$ to $t_{out6}$, effective sample times $t_{se3}$ to $t_{se5}$, adjustment points ADJ-4 to ADJ-6, and position sample values PSV3 to PSV5, with adjustments being made in the rate of change of the estimated position output EPO as the estimated position output EPO system follows the position sample values PSV that are nominally the actual position AP at their respective effective sample times.

It should be appreciated that the operations of the timing diagram shown in FIG. 2 are representative of operations that continue indefinitely in various exemplary embodiments according to this invention. The previous description is for an embodiment where a new rate of change of the estimated position output EPO is based on a difference between the position sample value PSV and the estimated position output EPO which both correspond to the previous effective sample time $t_{se}$. However, it should also be appreciated that in various other exemplary embodiments, a new rate of change of the estimated position output EPO can be based on a difference between a position sample value PSV and an estimated position output EPO which correspond to different times within the time interval $T_{outN}$ to $T_{outN+1}$. It should appreciated that this will somewhat degrade the accuracy of the corresponding estimated position outputs EPO. However, because the time interval $T_{outN}$ to $T_{outN+1}$ may be short relative to the response frequency of many practical mechanical motion systems and actuators, the estimated position outputs EPO from such an embodiments may still be adequately accurate for many practical applications.

Figure 3:
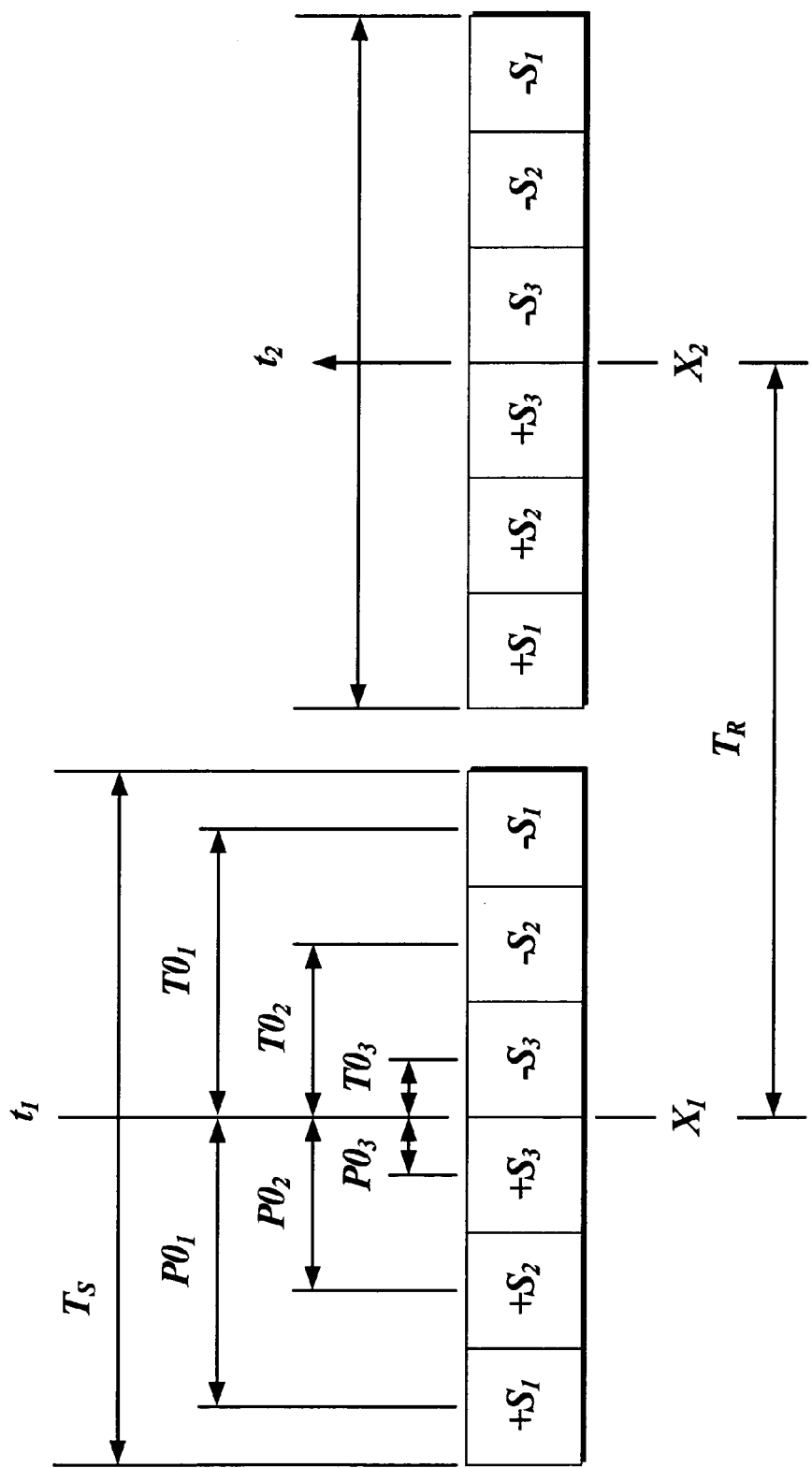
FIG. 3 is a timing diagram of a correlated double sampling sequence for a position sampled position transducer.

FIG. 3 is a diagram schematically illustrating an exemplary symmetric sampling sequence, such as that described in U.S. Pat. No. 6,304,832, incorporated above. Symmetric sampling is essentially a method of sequentially collecting signal samples from multiple position transducer signal channels. Briefly, for symmetric sampling, each signal channel is sampled twice—once at a respective time interval before an effective synthetic sample time and at the same respective time interval after the effective synthetic sample time. Thus, by averaging the two signal samples it is possible for each transducer signal channel to have the same effective synthetic sample time, which corresponds to a single transducer position, such that the multiple signal samples may be properly combined for determining that position. The effective synthetic sample time of such symmetric sampling methods is one embodiment of the effective sample time, described above with reference to FIG. 2, that is used in various exemplary embodiments according to this invention.

Phase signals S1, S2 and S3 are shown in FIG. 3 for one scale track of a position encoder. According to the symmetric sampling method, the three signals are sampled over a time $T_s$ such that a signal $+S_1$ is sampled during a first sampling interval at an effective sample time that precedes time $t_1$ by a preceding offset period $PO_1$. Similarly, a signal $+S_2$ is sampled during a second sampling interval, a signal $+S_3$ is sampled during a third sampling interval, a signal $-S_3$ is sampled during the fourth sampling interval, a signal $-S_2$ is sampled during a fifth sampling interval, and a signal $-S_1$ is sampled during a sixth sampling interval. Ideally, $PO_n$ equals $TO_n$ for these six signals. When all six signals have been acquired, they are combined into synthetic samples $S'_n$ in the following manner:

$$S'_1 = (+S_1) - (-S_1) \qquad \text{(Eq. 1)}$$

$$S'_2 = (+S_2) - (-S_2) \qquad \text{(Eq. 2)}$$

$$S'_3 = (+S_3) - (-S_3) \qquad \text{(Eq. 3)}$$

This method of combining the six signals into three, results in an averaging effect. If the transducer is in a state of high velocity motion during the sampling period, the averaging of the signals, as shown above, produces results similar to what would have been obtained if the six measurements would have been acquired simultaneously at the time $t_1$. The time $t_1$ is taken as the effective synthetic sampling time for the corresponding position measurement $X_1$ from the position transducer scale. When the three signals $S'_1$, $S'_2$, and $S'_3$ are processed, the position $X_1$ can be determined from these signals with a high degree of accuracy, independent of the velocity of motion. The times $t_1$ and $t_2$ are similar to the effective sample times $t_{se}$ of FIG. 2. As will be described in more detail below, these effective sample times $t_1$ and $t_2$ may also correspond to a QLATCH synchronizing signal.

Figure 4:
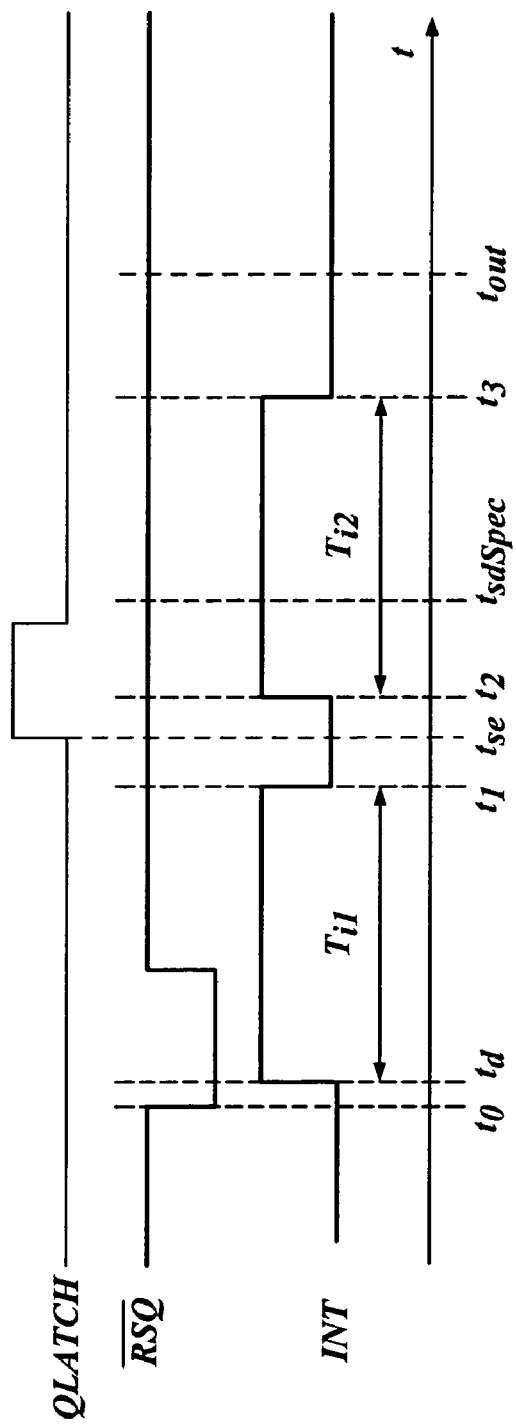
FIG. 4 is a timing diagram illustrating the operation of a position encoder including a QLATCH signal.

FIG. 4 is a timing diagram illustrating the operation of an exemplary embodiment of the position encoder 10 that utilizes symmetric sampling and a synchronizing QLATCH signal. FIG. 4 shows the timing of the signals QLATCH, RQS, and INT. As described in more detail below, the signal QLATCH is generally generated by the system that generates the control signals for the transducer position samples. The signal QLATCH is generated such that it occurs at the effective sample time $t_{se}$ of the transducer sampling sequence, as previously described.

In various exemplary embodiments the signal RQS may be a position request signal generated by the interface electronics 18. In various other exemplary embodiments the signal RQS may be a position sample initiating signal generated internally by the transducer electronics 16. The signal INT is an internal signal inside the readhead transducer electronics 16. The position sample process is initiated at a time $t_0$ by the reception of the RQS pulse (which is defined as active low), in a circuit of the transducer electronics 16. At a time $t_d$ (which is a short time after time $t_0$), as indicated by the signal INT going high, the readhead transducer electronics 16 begins to sample the transducer signals. The time delay between the time $t_0$ and the time $t_d$ includes any inherent minimum signal delays and startup periods required for the readhead 14 to actually start the sample acquisition after receiving the RQS pulse.

While the signal INT is high, during an integration interval $T_{i1}$, the readhead transducer electronics front-end reads and integrates at least one analog transducer output signal. This is the first of two similar samples in the symmetric sampling sequence. At a time $t_1$, the integration of the first sample ends and the readhead transducer electronics holds the sample for conversion to a digital value. The integration interval $T_{i1}$ may correspond to one or more of sampling intervals corresponding to the offset periods $PO_n$, as previously discussed with reference to FIG. 3. At a time $t_2$, acquisition of the second sample in the symmetric sampling sequence begins. Integration of the second sample continues for an integration interval $T_{i2}$. At a time $t_3$, the integration of the second sample ends and the readhead transducer electronics holds the second sample for conversion to a digital value. The integration interval $T_{i2}$ may correspond to one or more of the sampling intervals corresponding to the offset periods $TO_n$, as previously discussed with reference to FIG. 3. A position sample value output is available at a time $t_{out}$.

It should be appreciated that each sampled and held signal effectively captures the actual transducer position(s) for the corresponding sample time period. Therefore, these are the respective times and transducer positions which have a relation that is relevant to the effective sample time. The digital value conversion process has no such direct relation to the transducer position. Therefore, the digital value conversion process and associated data transmission is not discussed in detail herein as various methods for performing the digital value conversion process and associated data transmission will be apparent to one of ordinary skill in the art.

As shown in FIG. 4, an effective sample time $t_{se}$ is defined as being the median between the end of the first integration interval $T_{i1}$ and the start of the second integration interval $T_{i2}$. As described in more detail in the above incorporated U.S. Ser. No. 10/146,437 application, a desired specification delay time $t_{sdspec}$ is also illustrated. With regard to the effective sample time $t_{se}$, using the times $t_1$, and $t_2$, the effective sample time $t_{se}$ can be calculated according to the following equation:

$$t_{se} = \frac{t_1 + t_2}{2} \quad \text{(Eq. 4)}$$

As noted above, in various exemplary embodiments, the effective sample time $t_{se}$ determines the timing of the QLATCH signal. In various exemplary embodiments, the QLATCH signal ensures that the estimated position signal that is compared to the measured position sample value signal correspond to the same time.

Figure 5:
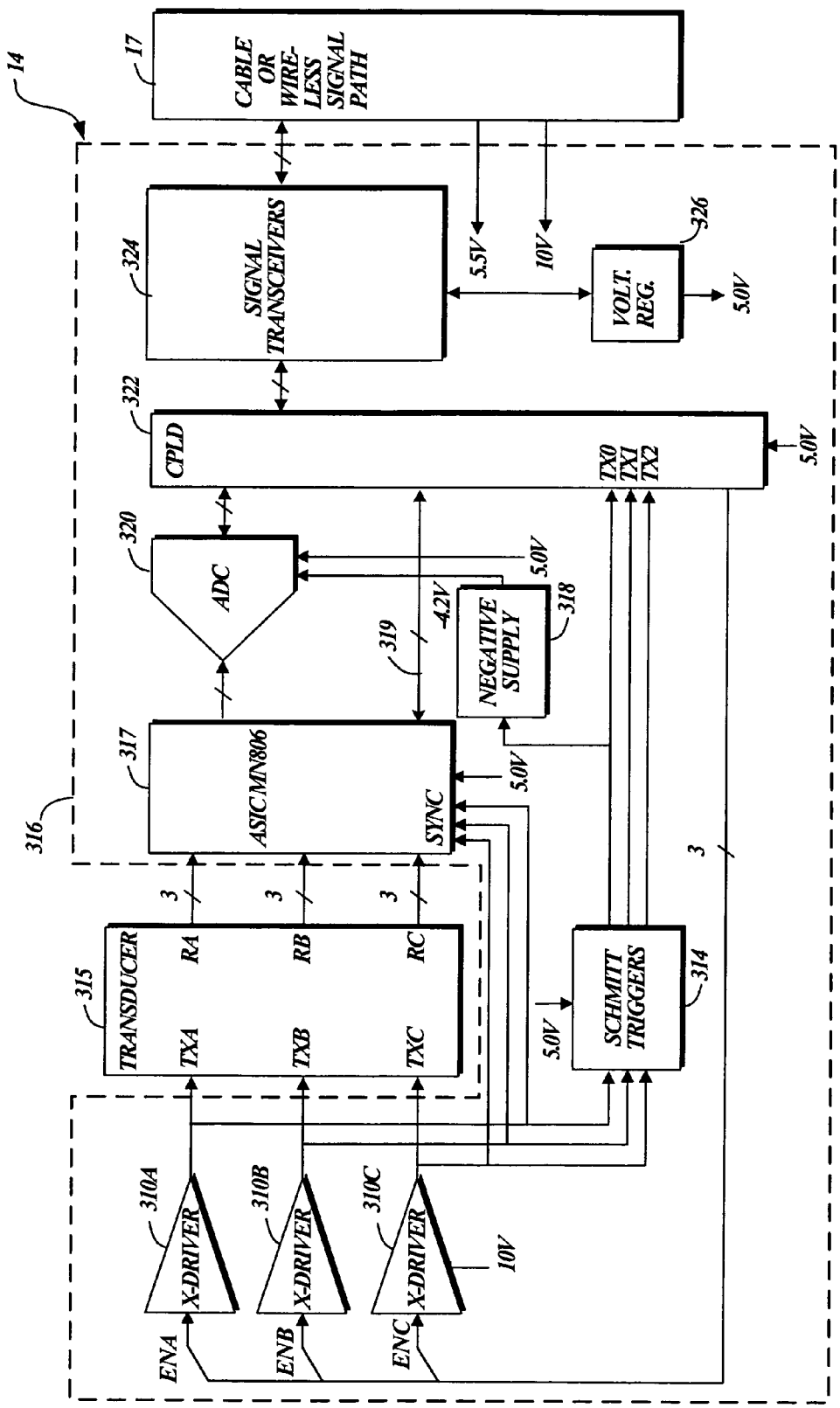
FIG. 5 is a block diagram of a position transducer readhead circuit.

FIG. 5 is a block diagram of one exemplary embodiment of a readhead 14, including an exemplary transducer electronics 316 and an exemplary readhead transducer element 315. As noted above, the QLATCH signal may be generated by the circuitry that determines the timing for the measured transducer signals, and thus the transducer electronics 316 may provide the QLATCH signal through the cable 17 to the interface electronics 18. In an alternate embodiment, the high frequency position estimation circuitry could be contained within the readhead 14, in which case the QLATCH signal could be self-contained.

The readhead transducer element 315 is the readhead portion of a 3-track absolute inductive position transducer such as that disclosed in the incorporated '832 patent. The transducer electronics 316 includes transmitter drivers 310A, 310B, and 310C, each of which receives a digital input signal ENA, ENB, and ENC, respectively, which enable the drivers. The drivers generate sine-wave signals that are input to respective transmitter windings TXA, TXB, and TXC of the readhead transducer element 315. Only one driver, corresponding to one track of the absolute inductive position transducer, is enabled at one time. In one embodiment, the sine-wave that is generated by the drivers may be in the frequency range of 10–16 megahertz, and this sine wave is also used as the readhead local oscillator which governs readhead operations, as described further below. A respective scale track (not shown) of the inductive position transducer modulates the amplitude of the transmitter signal as a function of position, and a respective set of receiver windings of the readhead transducer element 315 outputs the modulated signal amplitudes on respective sets of receiver pins RA, RB, or RC. In the embodiment shown in FIG. 5, each respective set of receiver pins corresponds to 3 receiver windings, corresponding to one track of the absolute inductive position transducer.

The respective sets of receiver pins RA, RB and RC are coupled to an application specific integrated circuit 317. The application specific integrated circuit 317 multiplexes the signals as needed, and then demodulates them to determine their respective signal amplitudes. The application specific integrated circuit 317 then amplifies and integrates the phase signals before they are multiplexed to the output of the application specific integrated circuit 317. The application specific integrated circuit 317 uses attenuated versions of the transmitter signals on its inputs SYNC to drive its synchronous demodulator.

A complex programmable logic device 322 communicates with the application specific integrated circuit 317 over one or more signal connections 319 and stimulates the application specific integrated circuit 317 to acquire the samples in a given sequence, then to output the samples, one at a time, to a differential analog-to-digital converter 320. The differential analog-to-digital converter 320 converts the analog signals to digital, and then clocks the data out on a serial port to the complex programmable logic device 322.

It should be appreciated that the operations of the application specific integrated circuit 317 and the differential analog-to-digital converter 320 may alternatively be combined into a single signal processing circuit that inputs analog signals from the position transducer element 315 and outputs corresponding digital data to the complex programmable logic device 322. The complex programmable logic device 322 passes the data to the signal transceiver chip 324, which outputs signals to the interface electronics via the cable 17 or alternative connections as previously described. The signal connections 319 may also carry various internal timing signals between the application specific integrated circuit 317 and the complex programmable logic device 322. The complex programmable logic device 322 may in turn relay timing signals to and from the signal transceiver chip 324. For example, in one exemplary embodiment the complex programmable logic device 322 may pass the QLATCH timing signal to the signal transceiver chip 324, which outputs the signal to the interface electronics 18 via the cable 17 or alternative connections as previously described.

In operation, the complex programmable logic device 322 detects the RQS pulse and begins the position sample sequence. The complex programmable logic device 322 controls the transmitter drivers 310A, 310B, 310C, the application specific integrated circuit 317, and the analog to digital converter 320, to produce position signal samples in a predetermined sequence.

The periodic transmitter signals at the outputs of the transmitter drivers 310A, 310B, and 310C are used as the readhead local oscillator which governs various readhead operations, as disclosed in the incorporated patents. The signals are converted from analog to digital clock signals by three Schmitt triggers 314. The complex programmable logic device 322 is coupled to clock signals from the Schmitt triggers 314 and selects the appropriate clock signal TX0–TX2 depending on which driver is enabled. The selected clock is used to clock the state machines inside the complex programmable logic device 322. This configuration is designed such that the state machines are generally synchronized with the application specific integrated circuit 317, so that proper timing can be maintained.

Figure 6:
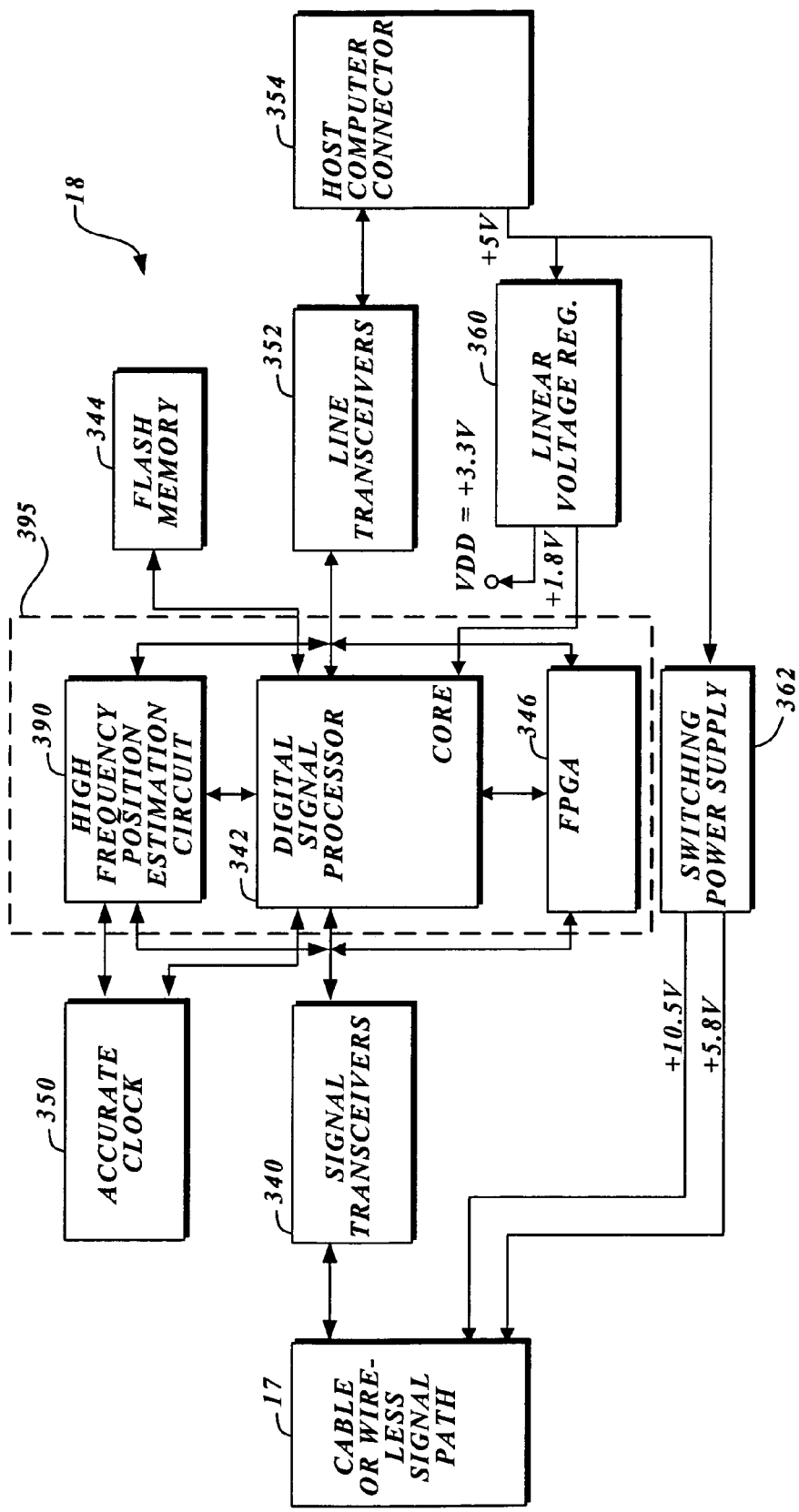
FIG. 6 is a block diagram of an interface electronic circuit.

FIG. 6 is a block diagram of one exemplary embodiment of the interface electronics 18. The interface electronics 18 is coupled to the host system computer through a host computer connector 354, which carries a power supply for the encoder system and couples communication signals to and from one or more line transceivers 352. The line transceivers 352 provides communication signals at designated voltage logic levels. In one embodiment, the power supply is a 5 volt supply and the designated voltage logic levels are 3.3 volts.

A dual linear voltage regulator 360 provides a required voltage, (in one embodiment 1.8 volts) for the core of a digital signal processor 342, as well as a supply voltage (in one embodiment 3.3 volts) for powering all of the logic devices in the interface electronics, including the signal transceivers 340 and line transceivers 35. A switching power supply 362, which receives a supply voltage from the host computer connector 354, provides two voltage levels to the cable 17 or alternative connections as previously described. In one embodiment, the two voltage levels provided by the switching power supply 362 are 10.5 volts and 5.8 volts, which are applied to the cable 17. The cable 17 carries power to, and signals to and from the readhead 14 (see FIG. 5). The signal transceivers 340 convert the signals over the cable 17 to and from the readhead signal transceiver chip 324 (see FIG. 5) to designated voltage logic levels. In one embodiment, the designated voltage logic levels are 3.3 volts.

It should be appreciated that in various alternative embodiments where the interface electronics is located in or near to the readhead 14, the cable 17 and the transceivers 340 and/or the signal transceiver chip 324 (see FIG. 5) may be omitted. It should be appreciated that in various other embodiments where the signal transceivers 340 send and receive signals in a wireless configuration, the cable 17 only carries power to the readhead 14 (see FIG. 5). In yet other embodiments where the signal transceivers 340 send and receive signals in a wireless configuration, the readhead 14 is supplied with power separately, and the cable 17 is eliminated.

The digital signal processor 342 exchanges commands and/or data with the host system computer or motion controller 30 (see FIG. 1) via the host computer connector 354 and the line transceiver 352. The digital signal processor 342 may also exchange commands and/or data with the readhead 14 via the signal transceivers 340 and the cable 17. The digital signal processor 342 also receives digitized data from the readhead 14. In various embodiments, the digital signal processor 342 also computes the absolute position based on data from the readhead 14 and exchanges position information with a high frequency position estimation circuit 390 according to this invention, as described further below. A high speed accurate clock 350 is connected to govern various operations of the digital signal processor 342.

In various embodiments, a flash memory 344 stores the digital signal processor 342 program code and transducer calibration data. In an alternate embodiment, the flash memory 344 may also store fuse maps for a field programmable gate array 346. The field programmable gate array 346 (which is not included in some embodiments) converts serial data from the readhead to an appropriate format for the digital signal processor 342. The field programmable gate array 346 may provide partial functionality of a universal asynchronous receiver-transmitter for host communications, and it may also be used to implement a dynamically programmable host interface protocol.

A high frequency position estimation circuit 390 according to this invention is connected to the digital signal processor 342 and is also connected to the high speed accurate clock 350, which governs various operations of the high frequency position estimation circuit 390. The high frequency position estimation circuit 390 in one embodiment may comprise high frequency quadrature signal generating circuitry. As will be described in more detail below with reference to FIG. 7, because the high speed clock runs independently of the operations of the readhead 14, the high frequency position estimation circuit 390 runs continuously, independent of and faster than the sampling process occurring in the transducer electronics 16. Thus, the high frequency position estimation circuit is able to produce quadrature outputs that can be utilized by selected types of standard processing circuitry in the industry, as previously described. As will also be described in more detail below with reference to FIG. 7, the high frequency position estimation circuit 390 may also include an error correction feedback loop for comparing the measured transducer position sample value PSV to the corresponding estimated position output EPO generated by the high frequency position estimation circuit 390. Furthermore, as will be described in more detail below with reference to FIG. 9, in various embodiments the high frequency position estimation circuit 390 may also be connected to the signal transceivers 340 and the cable 17 in order to receive a QLATCH signal from the transducer system readhead 14, which ensures that the measured position sample value PSV and the estimated position output EPO compared in the error correction feedback loop correspond to the same time. When such a QLATCH signal is provided, the estimated position output EPO can be made relatively more accurate.

As indicated by the dashed outline in FIG. 6, two or more of the digital signal processor 342, the high frequency position estimation circuit 390 and the field programmable gate array 346 can be provided by the circuits and/or operations of a highly integrated digital circuit 395. Thus, it should be appreciated that in various exemplary embodiments according to this invention, at least some of the circuits and/or operations of the digital signal processor 342, the high frequency position estimation circuit 390 and the field programmable gate array 346 may be merged and/or indistinguishable.

Figure 7:
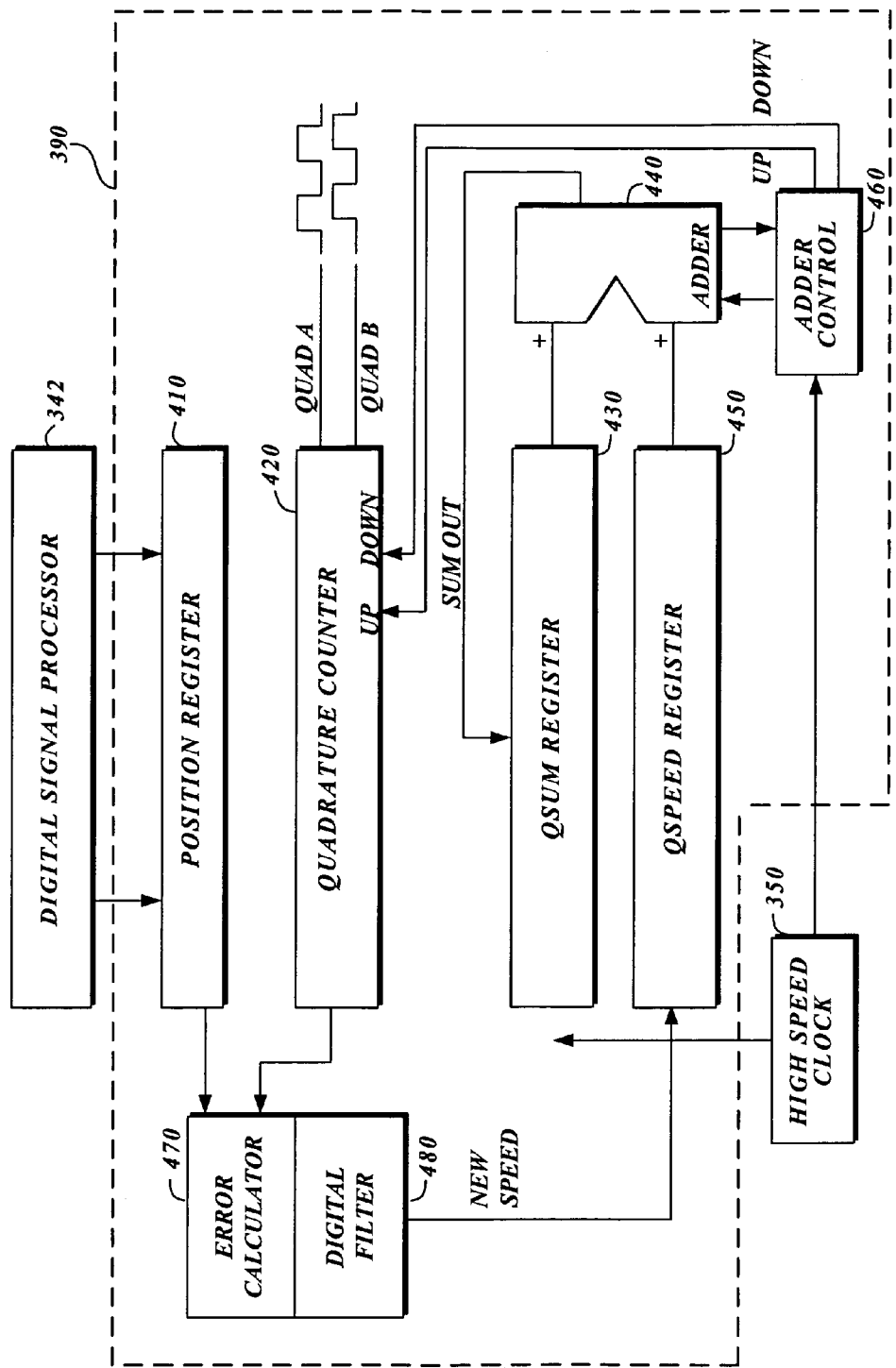
FIG. 7 is a block diagram of a first embodiment of a high frequency position estimation circuit that does not use a QLATCH signal.

FIG. 7 is a block diagram of one embodiment of high frequency position estimation circuit 390 that does not utilize a QLATCH signal. As shown in FIG. 7, the digital signal processor 342 and the high speed clock 350 (see FIG. 6) are coupled to the components of the high frequency position estimation circuit 390 that calculates the absolute position every T seconds. The high frequency position estimation circuit 390 includes a position register 410, a quadrature counter 420, a QSUM register 430, an adder 440, a QSPEED register 450, an adder control 460, an error calculator 470, and a digital filter 480.

In operation, the high frequency position estimation circuit 390 inputs a position value from the digital signal processor 342 that is the most recent position sample value PSV determined based on the most recent position samples acquired by the readhead 14. The most recent position sample value PSV is input to the position register 410. The quadrature counter 420, in addition to outputting the quadrature signals QUAD A and B, as outlined below, continuously holds a "real time" accumulated estimated position value based on the operations high frequency position estimation circuit 390. When a new position sample value PSV is input to the position register 410, the error calculator 470 inputs the new PSV and the current accumulated estimated position value, and determines the difference between these position values.

The digital filter 480 acts on the difference determined by the error calculator 470. The digital filter 480 implements various time/frequency filtering parameters and gain factors to achieve both rapid correction of estimated position errors by high frequency position estimation circuit 390 and "servo stability" of the high frequency position estimation circuit 390. The design and operation of such digital filters is commonly known by one skilled in the art of motion control, and may be determined by analysis and/or experiment for a particular type of transducer readhead and position encoder system according to this invention. Therefore the detailed design of the digital filter 480 is not described in detail herein.

In general, difference determined by the error calculator 470 will not be zero, that is, the estimated position error will not be zero. The error is acted upon by the digital filter 480, and the output of the digital filter 480 is the new value to load into the QSPEED register 450. In general, a value loaded into the QSPEED register 450 governs the rate that the estimated position output changes (as previously described with reference to FIG. 2), until the next new position sample value PSV is determined and input to the position register 410 and the previously described operations repeat.

In general terms, if the quadrature counter 420 value is larger than the position register 410 value, then the error in the error calculator 470 is negative, and the new value loaded into the QSPEED register 450 will be reduced from the previous value. This will reduce the quadrature frequency, and then the error will diminish. If the opposite situation is true, and the error is positive, the new value loaded into the QSPEED register 450 will be larger than the previous one, the quadrature frequency will increase, and then the error will again diminish in magnitude.

The QSUM register 430 acts as an integrator register. The value in the QSPEED register 450 and the value in the QSUM register 430 are continuously summed together in an adder 440, and the resulting sum is output back into the QSUM register 430. This summing operation occurs at a high frequency determined by the high speed clock 350. Because the summing frequency is much greater than the frequency at which new position sample values PSV are available and new values are loaded into the QSPEED register 450, the summing action can be accurately modeled as an integrator.

If the QSPEED register 450 contains a positive value, as it is continuously summed into the QSUM register 430 at a high rate, the adder 440 will periodically overflow due to the increasing value of the QSUM register 430 and output a carry pulse. The adder control circuit 460 will detect the carry pulse, and send a count up pulse to the quadrature counter register 420. If the QSPEED register 450 contains a negative value, as it is continuously summed into the QSUM register 430 at a high rate, the QSUM register 430 will periodically underflow due to the decreasing value of the QSUM register 430 and output a borrow pulse. The adder control circuit 460 will detect the borrow pulse, and send a count down pulse to the quadrature counter register 420. Every time the quadrature counter register 420 receives a count up or a count down pulse, it increments or decrements by one count, and also causes the two output bits on signal lines QUADA and QUADB to change by one increment, either up or down. As previously described, the rate at which the count up or count down pulse occurs is controlled by the value loaded in the QSPEED register 450. If the QSPEED register 450 is N bits wide, then the frequency of the up/down pulses, which is the quadrature counting frequency, is given by:

$$\text{Quadrature Frequency} = \frac{QSPEED}{2^N} F_{clock} \quad \text{(Eq. 5)}$$

where $F_{clock}$ is the frequency of the high speed clock. If N=16 for example, then the dynamic range of the quadrature outputs QUAD A and QUAD B is 65,536:1.

It will be appreciated that because the high speed clock 350 runs independently of the operations of the readhead 14, the high frequency position estimation circuit 390 runs continuously, independent of and faster than the sampling process occurring in the transducer electronics 16. Thus, the high frequency position estimation circuit is able to produce quadrature outputs that can be utilized by selected types of standard processing circuitry in the industry, as previously described.

Figure 8:
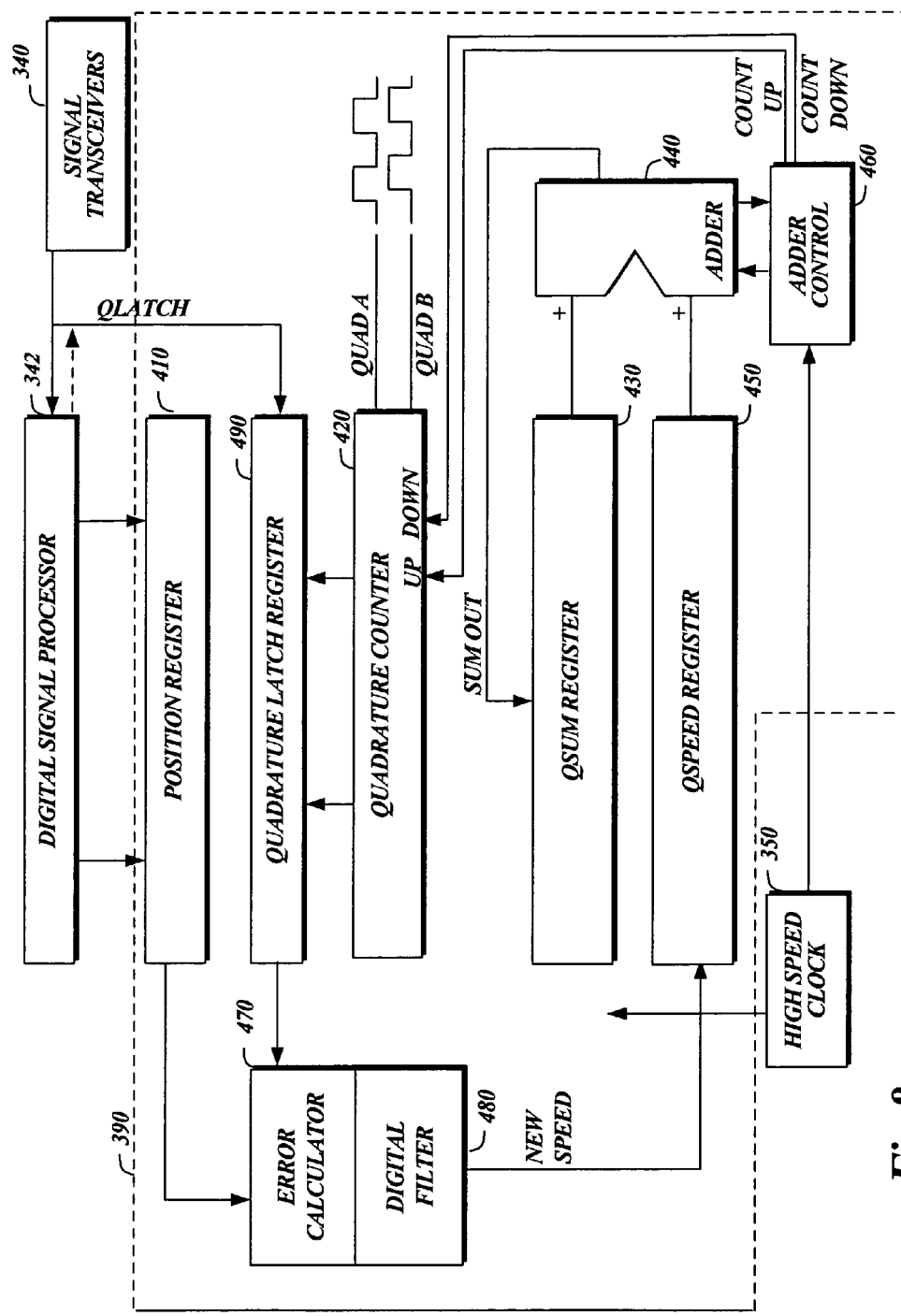
FIG. 8 is a block diagram of a second embodiment of a high frequency position estimation circuit that utilizes a QLATCH signal.

FIG. 8 is a block diagram of one embodiment of high frequency position estimation circuit 390 that utilizes a QLATCH signal. The embodiment shown in FIG. 8 includes similar elements and operates similarly to the embodiment shown in FIG. 7, unless otherwise indicated. Therefore, only certain elements that require additional explanation are described below.

In addition to the elements previously described with reference to FIG. 7, the embodiment shown in FIG. 8 also includes a control signal QLATCH, that is utilized to synchronize the estimated position signal of the high frequency position estimation circuit 390 with any new position sample value PSV that is input to the position register 410 and then to the error calculator 470. The QLATCH signal is provided from the digital signal processor 342 or directly from the readhead 14 through the signal transceivers 340 (see FIG. 6) to a quadrature latch register 490.

As described above with reference to FIG. 4, the signal QLATCH is timed so that it occurs at the effective sample time of the readhead 14. Thus, when the signal QLATCH is received by the high frequency position estimation circuit 390, it causes the quadrature latch register 490 to immediately record a copy of the accumulated estimated position value in the quadrature counter 420. The value stored into the quadrature latch register 490 then corresponds with a high level of accuracy to the position values determined for the effective sample time corresponding to the generated QLATCH signal. It will be appreciated that the signal QLATCH thus provides a synchronizing link between the two systems, which are operating at two different rates. Thus, when the error calculator 470 and the digital filter 480 operate on values in the quadrature latch register 490 and the position register 410, there will be little or no error introduced by effective timing differences and the accuracy of the estimated position values and/or quadrature signals QUAD A and QUAD B output by the high frequency position estimation circuit 390 will have enhanced accuracy relative to those output by the embodiment described with reference to FIG. 7.

While various exemplary embodiments of the invention have been illustrated and described above, it will be appreciated that various changes can be made therein without departing from the spirit and scope of the invention.

The embodiments of the invention in which an exclusive property or privilege is claimed are defined as follows:

1. A position monitoring system, comprising:
   a position transducer;
   a transducer signal processing circuit operably connectable to the position transducer; and
   an interface circuit that includes an estimated position signal generating circuit operably connectable to the transducer signal processing circuit;
   wherein:
      the transducer signal processing circuit generates a transducer sample position output value corresponding to the actual position of the position transducer, according to a transducer sample position value output interval that is not less than a minimum transducer sample position output interval;
      the estimated position signal generating circuit generates an approximated position output approximating the position of the position transducer, at a plurality of times between the generating of a transducer sample position output value corresponding to the actual position of the position transducer, according to an approximated position output cycle interval which is shorter than the minimum transducer sample position output interval;
      the approximated position output is incremented by a prescribed increment amount during each approximated position output cycle;
      the prescribed increment amount is adjusted when a new transducer sample position output value corresponding to the actual position of the position transducer becomes available; and
      the adjustment of the prescribed increment amount is based at least partially on a determined difference between a particular approximated position output and the new transducer sample position value.

2. The position monitoring system of claim 1, wherein at least one of the position transducer and the transducer signal processing circuit and the estimated position signal generating circuit is operably connectable to at least one other of the position transducer and the transducer signal processing circuit and the estimated position signal generating circuit, through one of a wireless communication interface circuit and a wired connection.

3. The position monitoring system of claim 1, wherein the determined difference is based on a particular approximated position output that is selected by one of the transducer signal processing circuit and the estimated position signal generating circuit, based on timing information corresponding to the timing of the new transducer sample position.

4. The position monitoring system of claim 3, wherein the timing information corresponding to the timing of the new transducer sample position is a value-latching signal output by the transducer signal processing circuit and input by the estimated position signal generating circuit.

5. The position monitoring system of claim 3, wherein the timing information corresponding to the timing of the new transducer sample position is one of serially-transmitted timing data and parallel-transmitted timing data, output by the transducer signal processing circuit and input by the estimated position signal generating circuit.

6. The position monitoring system of claim 1, wherein;
   the interface circuit includes elements that determine the timing of the particular approximated position output;
   the transducer sample position value output interval is determined by one of the transducer signal processing circuit and the interface circuit based at least partially on timing information generated in the interface circuit corresponding to the timing of the particular approximated position output.

7. The position monitoring system of claim 6, wherein the timing information corresponding to the timing of the particular approximated position output is a timing signal output by the estimated position signal generating circuit and input by the transducer signal processing circuit.

8. The position monitoring system of claim 1, wherein the ratio of the nominal approximated position output cycle interval to the minimum transducer sample position output interval allows at least 500 approximated position outputs during the minimum possible transducer sample position output interval.

9. The position monitoring system of claim 8, wherein the ratio of the nominal approximated position output cycle interval to the minimum possible transducer sample position output interval allows at least 1800 approximated position outputs during the minimum possible transducer sample position output interval.

10. The position monitoring system of claim 1, wherein the position transducer comprises an inductive position transducer and the approximated position output approximating the position of the position transducer comprises a quadrature output.

11. The position monitoring system of claim 10, wherein the inductive position transducer comprises an absolute inductive position transducer.

12. The position monitoring system of claim 10, wherein the transducer signal processing circuit comprises a symmetric sampling transducer signal processing circuit.

13. The position monitoring system of claim 10, wherein the approximated position output cycle interval corresponds to a maximum quadrature signal frequency, and the maximum quadrature signal frequency is greater than 500 Kilohertz, corresponding to a quadrature counting frequency of 2 million counts per second.

14. The position monitoring system of claim 13, wherein the maximum quadrature signal frequency is greater than 2.5 megahertz, corresponding to a quadrature counting frequency of 10 million counts per second.

15. A position monitoring system, comprising:
a position transducer;
a transducer signal processing circuit operably connectable to the position transducer; and
an interface circuit operably connectable to the transducer signal processing circuit, the interface circuit including an estimated position generating circuit that generates approximated position outputs approximating the position of the position transducer, at a plurality of times between the times that the transducer signal processing circuit generates discrete transducer sample position output values corresponding to the actual position of the position transducer;
wherein:
the transducer signal processing circuit generates a discrete transducer sample position value output, corresponding to the actual position of the position transducer, at a particular time;
the transducer signal processing circuit generates a timing information signal corresponding to the particular time; and
the transducer sample position value output and the corresponding timing information signal corresponding to the particular time are output to the estimated position generating circuit.

16. The position monitoring system of claim 15, wherein the timing information signal corresponding to the particular time is one of a signal usable to operate a value-latching circuit, a serially-transmitted timing data signal and a parallel-transmitted timing data signal.

17. The position monitoring system of claim 15, wherein the timing information signal corresponding to the particular time is output at a time which is not the particular time.

18. The position monitoring system of claim 15, wherein:
the estimated position generating circuit generates the approximated position outputs according to a nominal approximated position output cycle interval which is shorter than a minimum transducer sample position value output interval of the transducer signal processing circuit;
the transducer signal processing circuit is operably connected to the position transducer and to the estimated position generating circuit;
the transducer signal processing circuit outputs the generated discrete transducer sample position value output corresponding to the actual position of the position transducer at a particular time, and the generated timing information signal corresponding to the particular time, to the estimated position generating circuit;
the estimated position generating circuit generates a first plurality of approximated position outputs that are incremented at a first rate prior to receiving one of the generated discrete transducer sample position value outputs corresponding to the actual position of the position transducer at a particular time and the generated timing information signal corresponding to the particular time; and
the estimated position generating circuit generates a second plurality of approximated position outputs that are incremented at a second rate after receiving the one of the generated discrete transducer sample position outputs corresponding to the position of the position transducer at the particular time and the generated timing information signal corresponding to the particular time, the second rate based at least partially on the one of the generated discrete transducer sample position value outputs corresponding to the actual position of the position transducer at the particular time, the generated timing information signal corresponding to the particular time, and an approximated position output corresponding to the particular time.

19. The position monitoring system of claim 18, wherein the position generating circuit is remotely located from the transducer signal processing circuit.

20. The position monitoring system of claim 18, wherein the estimated position generating circuit comprises at least a portion of one of a special-purpose custom digital circuit, a programmed commercial gate array, a programmed commercial digital signal processing circuit, a programmed general-purpose computer, a programmed motion-controller, a general-purpose computer, and a programmed computer used as a motion control system host.

21. A method for operating a position monitoring system, the position monitoring system comprising:
a position transducer;
a transducer signal processing circuit operably connectable to the position transducer; and
an interface circuit including an estimated position signal generating circuit operably connectable to the transducer signal processing circuit;
the method comprising:
generating a transducer sample position value output corresponding to the actual position of the position transducer, according to a transducer sample position output interval that is not less that a minimum transducer sample position output interval, using the transducer signal processing circuit;
generating approximated position outputs using the estimated position signal generating circuit, according to an approximated position output cycle interval which is shorter than the minimum transducer sample position output interval, at a plurality of times between the generating of transducer sample position value outputs corresponding to the actual position of the position transducer;
incrementing the approximated position output by a prescribed increment amount during each approximated position output cycle;
adjusting the prescribed increment amount when a new transducer sample position value output corresponding to the actual position of the position transducer is available, wherein the adjustment of the prescribed increment amount is based at least partially on a determined difference between a particular approximated position output and the new transducer sample position value.

22. The method of claim 21, further comprising selecting the particular approximated position output based on timing information corresponding to the timing of the new transducer sample position value corresponding to the actual position.

23. The method of claim 22, wherein the timing information corresponding to the timing of the new transducer sample position value is a value-latching signal, and selecting the particular approximated position output comprises outputting the value-latching signal from the transducer signal processing circuit, inputting the value-latching signal to the estimated position signal generating circuit, and latching an approximated position output that is used as the particular approximated position output.

24. The position monitoring system of claim 22, wherein the timing information corresponding to the timing of the new transducer sample position is one of serially-transmitted timing data and parallel-transmitted timing data, output by the transducer signal processing circuit and input by the estimated position signal generating circuit, and selecting the particular approximated position output comprises selecting an approximated position output that is used as the particular approximated position output, based on the one of serially-transmitted timing data and parallel-transmitted timing data.

25. The method of claim 21, wherein generating approximated position outputs using the estimated position signal generating circuit, according to an approximated position output cycle interval which is shorter than the minimum transducer sample position output interval comprises generating at least 500 approximated position outputs during the minimum possible transducer sample position output interval.

26. The method of claim 21, wherein generating approximated position outputs comprises generating at least 1800 approximated position outputs during the minimum possible transducer sample position output interval.

27. The method of claim 21, wherein generating approximated position outputs comprises generating quadrature outputs.

28. The position monitoring system of claim 21, wherein the position transducer is an inductive position transducer and the operation of generating a transducer sample position value output corresponding to the actual position of the position transducer comprises generating an absolute position value.

29. The position monitoring system of claim 21, wherein the transducer signal processing circuit operably connectable to the position transducer comprises a symmetric sampling transducer signal processing circuit.

* * * * *

UNITED STATES PATENT AND TRADEMARK OFFICE
CERTIFICATE OF CORRECTION

PATENT NO. : 7,094,978 B2 Page 1 of 1
APPLICATION NO. : 10/298339
DATED : August 22, 2006
INVENTOR(S) : D. Skurnik It is certified that error appears in the above-identified patent and that said Letters Patent is hereby corrected as shown below:

COLUMN  LINE

18    34    "wherein;" should read --wherein:--

Signed and Sealed this

Fifth Day of December, 2006

JON W. DUDAS
*Director of the United States Patent and Trademark Office*